(12) United States Patent
Kim et al.

(10) Patent No.: US 6,328,210 B1
(45) Date of Patent: Dec. 11, 2001

(54) CARD FOR DRIVER AND TRAFFIC-RELATED BUSINESS CONDUCTING APPARATUS AND METHOD USING THE SAME

(75) Inventors: Si-Won Kim, Seoul; In-Seong Baik, Anyang, both of (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 08/568,232

(22) Filed: Dec. 6, 1995

(30) Foreign Application Priority Data

Dec. 19, 1994 (KR) .................................. 94-35071

(51) Int. Cl.⁷ ........................... G06K 13/06; G06K 13/24
(52) U.S. Cl. ........................................... 235/384; 235/380
(58) Field of Search .................... 235/379, 384, 235/380; 705/13, 416, 417

(56) References Cited

U.S. PATENT DOCUMENTS

| | | | |
|---|---|---|---|
| 4,634,845 | 1/1987 | Hale et al. | 235/380 |
| 4,961,142 | 10/1990 | Elliott et al. | 364/408 |
| 4,982,072 * | 1/1991 | Takigami | 235/384 |
| 4,995,081 | 2/1991 | Leighton et al. | 380/23 |
| 5,337,358 * | 8/1994 | Axelrod et al. | 235/380 X |
| 5,459,304 * | 10/1995 | Eisenmann | 235/380 |

* cited by examiner

Primary Examiner—Karl D. Frech
(74) Attorney, Agent, or Firm—Robert E. Bushnell, Esq.

(57) ABSTRACT

An IC card for the operators of vehicles in traffic, with which a traffic-related business conducting apparatus is used, and a method using the same are provided. The card includes a data memory for recording and reading out data and a controller for reading out and recording the data stored the data memory. The data can selectively be input or output to/from an external device, so as to process the traffic-related business on-line or off-line with a central processing unit. Police business is enhanced in view of efficiency and security and drivers are provided with greater convenience.

11 Claims, 3 Drawing Sheets

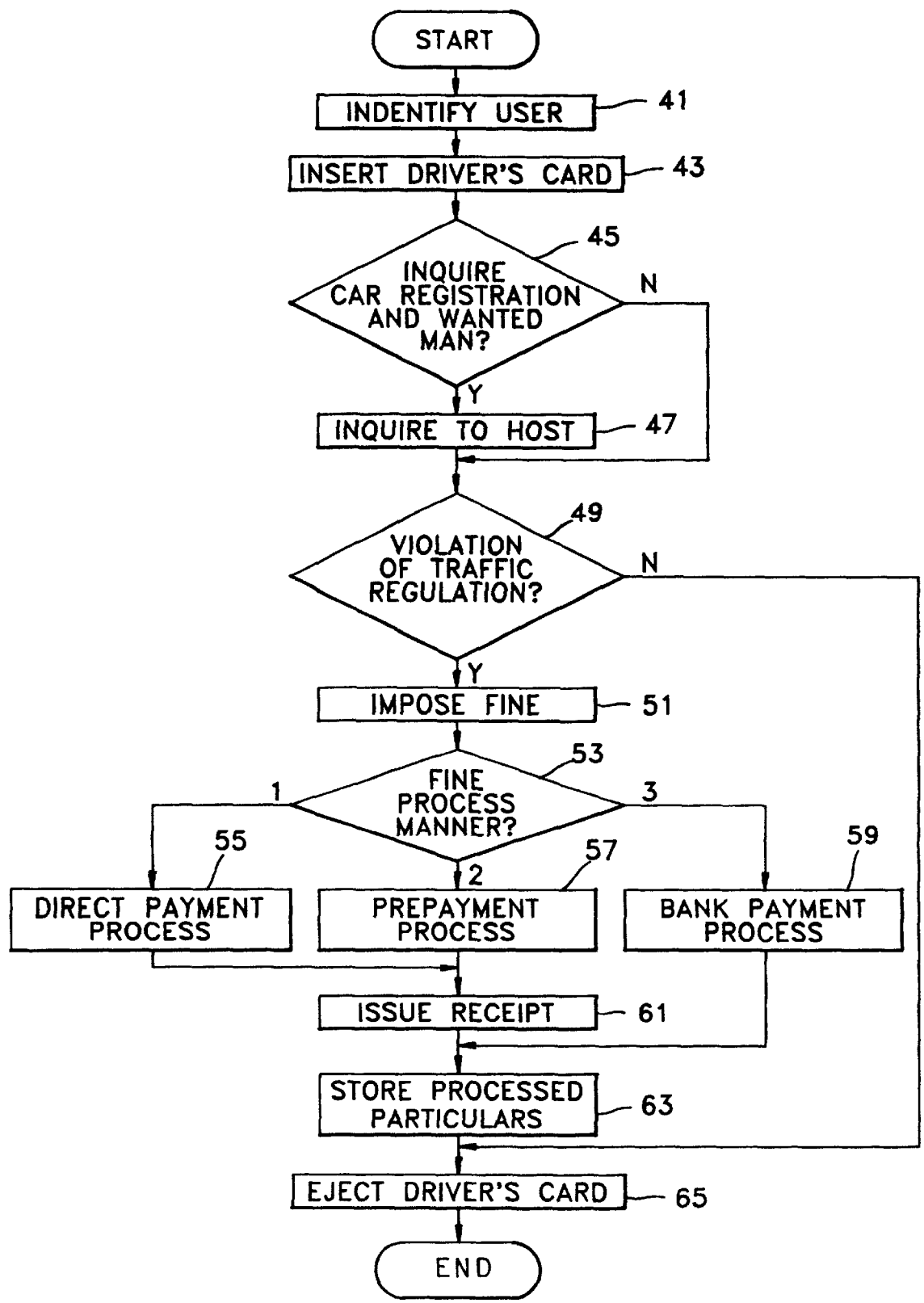

CARD FOR DRIVER AND TRAFFIC-RELATED BUSINESS CONDUCTING APPARATUS AND METHOD USING THE SAME

CROSS REFERENCE TO RELATED APPLICATIONS

This application makes reference to, incorporates the same herein, and claims all benefits accruing under 35 U.S.C §119 from an application entitled Card For Driver And Traffic-Related Business Conducting Apparatus And Method Using The Same earlier filed in the Korean Industrial Property Office on Dec. 19, 1994, which was duly assigned Ser. No. 35071/1994 by that Office.

BACKGROUND OF THE INVENTION

The present invention relates to a card for a driver and a traffic-related business conducting apparatus and method using the same, and more particularly, to an IC card (integrated circuit card) for a driver to be used for traffic-related business and an apparatus and method using the same for conducting the traffic-related business arising between a driver and a traffic policeman.

Magnetic strip cards are cards of a plastic or paper medium having a magnetic recording medium attached thereto; an example of the former being a bank cash card or credit card, and an example of the latter being a prepaid coupon-type card such as phone card or subway token. As an alternative to the magnetic strip card, there is an IC card having an integrated circuit chip installed in a card medium provided with components such as a display and battery. An IC card (or "smart" card) comprises a RAM, a ROM, a central processing unit, and a nonvolatile memory for storing such information as card-issuer and card-user data.

In general, police business, particularly traffic-related business, is done manually. Accordingly, if a motorist wants to know information related to a traffic violation, e.g., demerit marks, or points, or the amount of a fine, there is no choice but to search at an administrative center.

Although police do make use of an electronic inquiry machine for police business, e.g., a wanted-car search, security is not reliable and the machine is costly.

SUMMARY OF THE INVENTION

To solve the above problems, it is an object of the present invention to provide a motorist a process and a card for use in traffic-related business.

It is another object to provide apparatus for conducting traffic-related business by using a card issued to a motorist, provided with a memory.

It is still another object to provide a method for conducting traffic-related business by using a card issued to a motorist, provided with a memory.

These and other objects may be attained with a card is provided to a driver for use in traffic-related business. The card includes a data memory portion for storing data and a controller for reading out and recording data from and to the data memory portion and selectively writing or reading the data to and from an external device. The data memory portion uses a driver information area in which information for identifying the driver is recorded and a traffic-related information area in which the driver's traffic-related information is recorded.

These is alternatively provided an apparatus used for conducting a traffic-related business with a card issued to a motorist to be used for the traffic-related business, for recording and reading identification information about the driver and the traffic-related information. A central processing unit is used for storing identification information about the driver and other drivers, and for storing traffic-related information and processing any information transmitted from a portable terminal unit which processes the identification of the driver and traffic-related information, such as fine payment, using the card by selectively communicating on-line or off-line with the central processing unit; and an input and output interface for reading the result processed by the portable terminal unit.

These is additionally provided a method for conducting traffic-related business by searching for traffic-related information about a driver including accident records and penalty records recorded in a card issued to the driver; searching for related information about the driver such as car registration or wants and warrant on-line with a central processing unit, if needed; processing a payment for a fine imposed for violation of traffic regulations; storing information generated during the fine processing step in the card and in a traffic policeman's portable terminal unit, respectively; and transmitting on-line to the central processing unit collectively the information stored in the portable terminal unit.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 4 is a flowchart showing the process of performing traffic-related business using the driver's integrated circuit card according to the principles of the present invention.

DETAILED DESCRIPTION OF THE INVENTION

Figure 1:
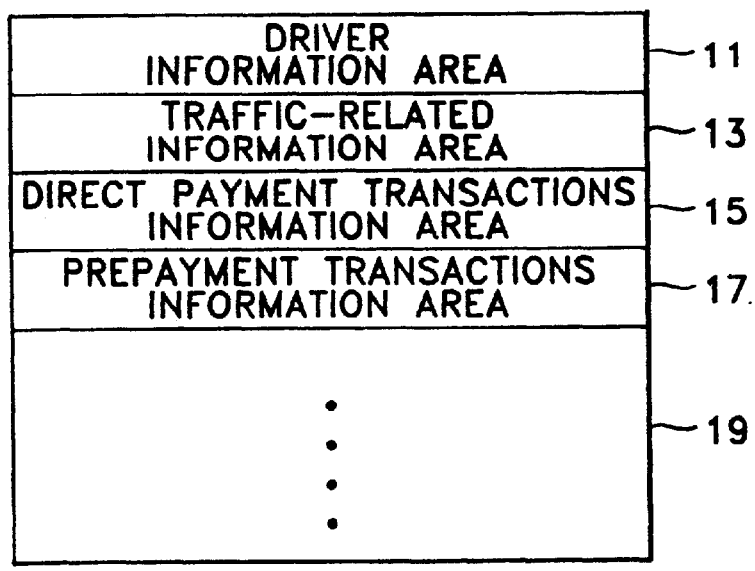
FIG. 1 is a view illustrating the information format of an IC card for a motorist for use in traffic-related business according to the principles of the present invention.

Turning now to the drawings, FIG. 1 shows the information format of an IC card issued to a motorist for use in traffic-related business according to the present invention. The IC card comprises a data memory portion for recording or reading out data and a controlling portion (not shown) for reading data out of or recording data into the data memory portion, and can selectively input or output the data from and to an external device.

The data memory portion of the IC card issued to a driver has a driver information area 11 for identifying the driver and includes the driver's address and other related information on the driver, and a traffic-related information area 13 for the driver's traffic-related history including an accident record, demerit marks (points) counted and particulars on fines. Also, the IC card further includes information areas 15 and 17 for direct payment transactions and prepayment transactions, in order to conduct directly the fine payment for a fine levy according to the violation of traffic regulations. Information areas 19 are reserved for storage of supplemental and alternative information.

Direct payment transaction information area 15 includes information about money deposited in the driver's bank account (e.g. such as an account dedicated and maintained specially for automotive and traffic related expenses), and transactions are made through use of the IC card. When money is paid from information, such as the amount of money the driver has in the bank account, stored in area 15, then information regarding that payment is recorded in area 15. Then, once a day or once a week, the driver takes the IC card to his bank and settlement is made between the bank and the driver. Money can also be paid directly by the bank when information regarding a transaction is transmitted to the bank. Is such a case, the bank makes payment directly from the driver's bank account and returns information to the IC card indicating that the transaction has been completed, such as amount paid and to whom the amount was paid. The information returned from the bank is then stored in area 15 of the IC card. There are two ways for settling an account by the direct payment method: an on-line settlement by which the bank directly pays the transaction using information stored in the IC card for the driver; and an off-line settlement type by which the transaction information is recorded in a recording medium and the transactions with the bank are settled collectively once a day or once a week.

Prepayment transaction information area 17 includes information on a prepaid sum of money, paid to a bank for example, after being issued, or purchasing, the IC card. Transactions, such as a fine payment, can be paid from this sum of money. Accordingly, when a payment is made it is applied against this sum of money by subtracting the payment amount from the prepaid sum leaving a balance against which further payments may be applied. Payments, utilizing prepayment transaction information area 17, can be made as long as there is a positive balance; a negative balance is not allowed.

Accordingly, the direct payment method requires that communication be established between the IC card and the bank, whereas the prepayment method can be completed on site without a need to communicate directly with the bank.

Additionally, the IC card can be used as a multipurpose card for a driver, which can also include a bank credit card function and a phone card function, stored in area 19 for example, which can be used for banking/purchasing services and public telephone services, respectively.

Figure 2:
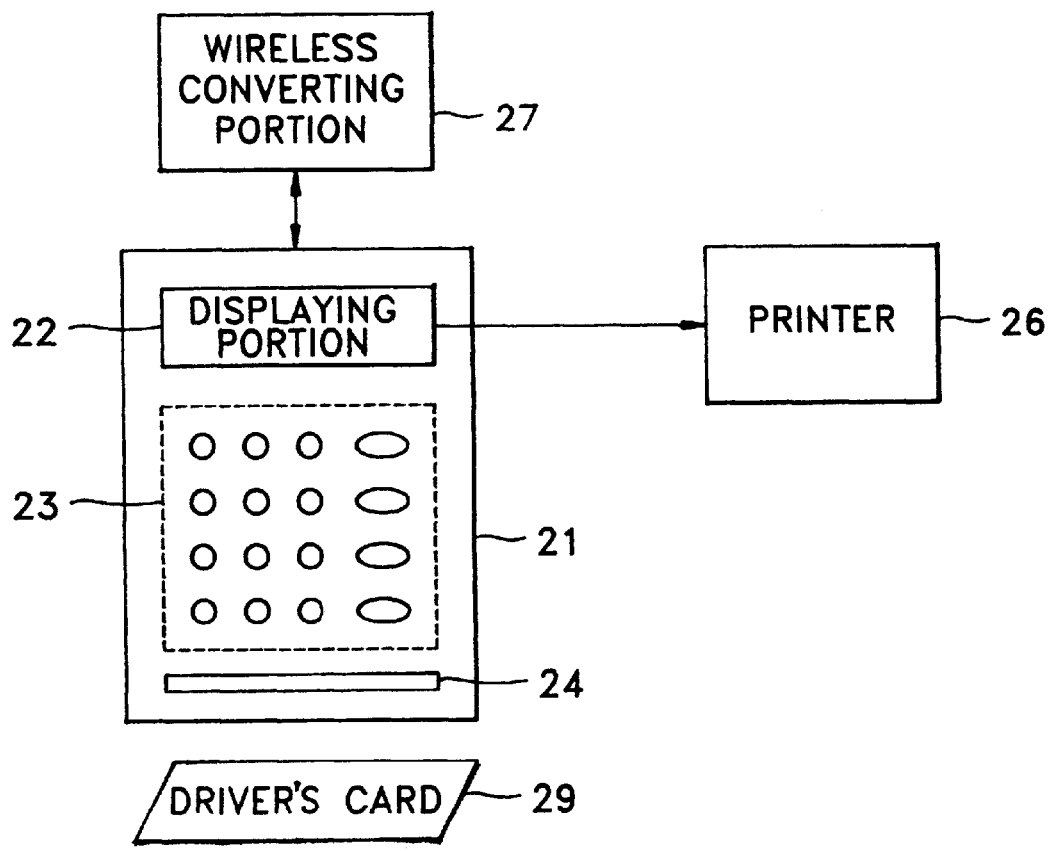
FIG. 2 is a block diagram illustrating the configuration of the apparatus for conducting traffic-related business using the driver's IC card according to the principles of the present invention.

FIG. 2 shows the configuration of an apparatus for conducting traffic-related business using the driver's card 29 according to the present invention. The apparatus comprises a portable terminal 21, a printer 26 for printing a receipt or a notice, and a wireless converter 27 for sending/receiving information by radio transmission. Card 29, issued to a driver, contains information as discussed above with respect to FIG. 1, which is recorded and read out by portable terminal 21 having a card insertion portion 24 for receipt of card 29.

A central processing unit (not shown), which is installed in a police station, controls all the traffic-related business conducted by a policeman, and stores not only the information about the driver's identification and current traffic-related information, but also stores information about whether the driver has any outstanding wants or warrants and information regarding car(s) registered to the driver. The central processing unit stores the information transmitted from portable terminal 21, or searches for internally stored information to be transmitted to portable terminal 21. The exchange of the information is achieved by connecting the central processing unit with portable terminal 21 directly or via radio communication.

Portable terminal 21 is outwardly constructed with a card insertion portion 24 into which card 29 is inserted, key input portion 23 for inputting data, such as that required by a policeman, and displaying portion 22 for displaying data recalled from information areas 11, 13, 15, 17 and 19, data transmitted to portable terminal 21, data input by activation of key input portion 23, and other pertinent information.

Portable terminal 21 processes information, such as a fine imposed according to a violation of traffic regulations, fine payment through a prepayment account or a direct payment account and so forth by communicating with a central processing unit selectively. The communication between portable terminal 21 and the central processing unit can be made on-line or off-line. The information regarding the transaction is stored in driver's card 29 and portable terminal 21. For the on-line process, portable terminal 21 collectively communicates with the central processing unit installed in a police station by a direct connection, or by using wireless converting portion 27. For the off-line process, portable terminal 21 can perform the necessary transactions, without communicating with the central processing unit, with the results being stored in card 29 and stored in portable terminal 21 for later transfer to the central processing unit installed in a police station.

Wireless converting portion 27 is additionally connected to terminal 21 and processes on-line by wireless data transmission between terminal 21 and the central processing unit. Also, wireless converting portion 27 is used in communicating with the central processing unit in the case of an inquiry of a wanted person or stolen car, i.e., when terminal 21 must refer to the data of the central processing unit.

Printer 26 is a thermal printer which prints out inquiry and transaction information, such as a notice of particulars on a fine imposed on a driver, or prints out a receipt of payment particulars when the fine is paid by prepayment transactions or direct payment transactions.

Figure 3:
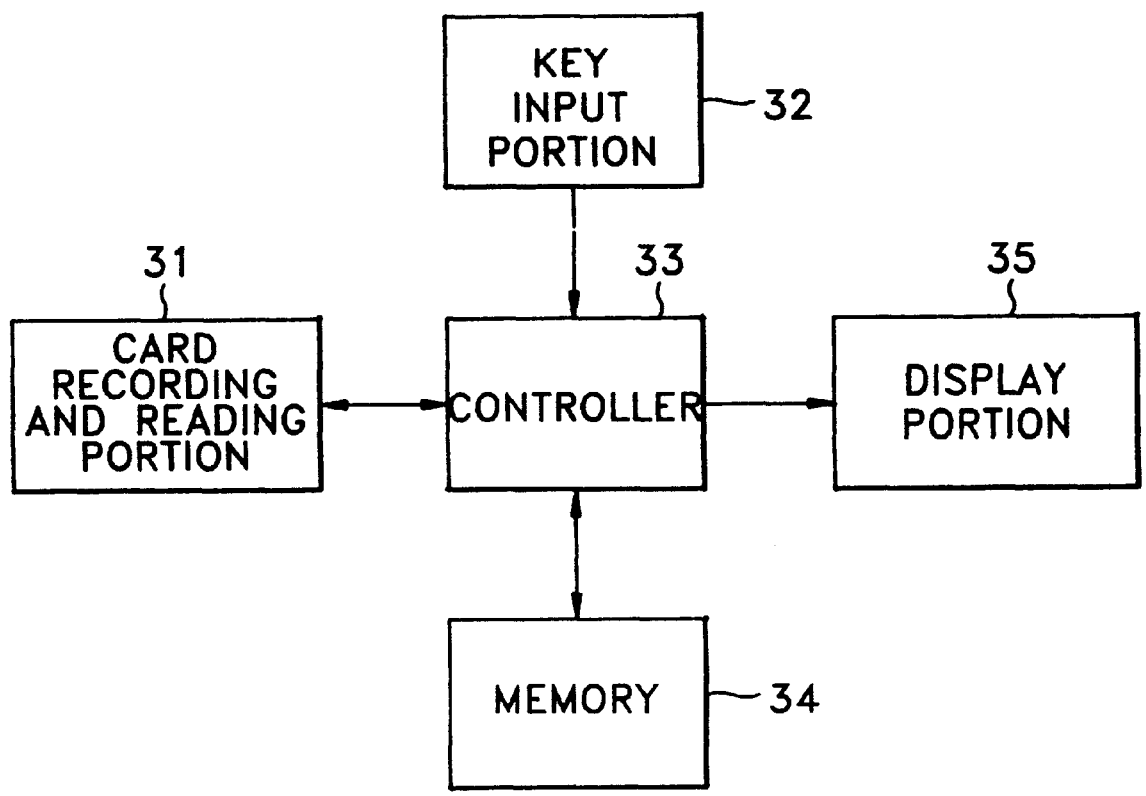
FIG. 3 is a detailed block diagram illustrating the configuration of a circuit fro construction of the portable terminal shown in FIG. 2.

FIG. 3 shows details of the configuration of portable terminal 21 shown in FIG. 2. Portable terminal 21 comprises a card recording and reading out portion 31 for recording or reading out data on and from card 29, a key input portion 32 for establishing the operational mode of portable terminal 21 and inputting required data, a memory 34 for storing and reading out data, a displaying portion 35 for displaying information read out or input, and a controller 33 for controlling all the functions of portable terminal 21 and controlling data input/output between card 29 and the central processing unit (not shown).

Card recording and reading portion 31 reads out data recorded in card 29, when card 29 is inserted in card insertion portion 24, and transmits the read out data to controller 33, or records in card 29 data transmitted from controller 33.

Through key input portion 32 the operating mode of the portable terminal is set and the information about the traffic-related business carried out by a policeman including particulars on any fine imposed on a driver and the information needed in issuing a receipt or a notice, is input. Input data is transmitted to controller 33.

Displaying portion 35 displays, by the control of controller 33, information read out from card 29, information readout from memory 34, information input through key input portion 32, or information received from the central processing unit.

Memory 34 stores information read out from card 29, data input by a policeman, payment information or information transmitted from the central processing unit.

Controller 33 processes the information read out from card 29, data input through key input portion 32 and data input from the central processing unit. Controller 33 controls the operation of memory 34 and displaying portion 35, and the data input/output between card 29 and the central processing unit.

FIG. 4 shows a process of conducting traffic-related business using card 29 and portable terminal 21 according to the present invention. The method of the present invention is applied to a traffic-related business conducting apparatus, shown in FIG. 2, which is provided with card 29 and a portable terminal 21, and which is capable of establishing communication with a central processing unit (not shown).

First, when portable terminal 21 is first powered on, authorized use is established by inserting a policeman's ID card into card insertion portion 24 before the terminal can be used, in order to maintain the security of terminal usage and prevent its misuse or surreptitious use. In step 41 the policeman's identification is checked and upon verification enables the terminal to be used. In step 43 a driver's card 29 is inserted in card insertion portion 24, and information recorded in card 29 for a driver is searched for and read out from the data memory portion of card 29, wherein the information on the driver may include residence, driver's license number, car registration, accident history and demerits.

When an inquiry, such as car registration or whether the driver is a wanted person (e.g., a fugitive), is desired, in step 45, then the inquiry is made, on-line with the central processing unit, through wireless converting portion 27 or by radio, in step 47. When an inquiry on car registration or whether the driver is wanted is not desired, then portable terminal 21 continues conducting the traffic-related business off-line and the process proceeds to step 49.

In step 49, it is decided whether there was a violation of a traffic regulation and whether to impose a fine. When no fine is to be imposed then the driver's card is ejected from terminal 21 and an oral warning may be given the driver. When a fine is imposed, step 51, for the violation of a traffic regulations, the driver can choose, in step 53, any one among a direct payment process 55, prepayment process 57 and bank payment process 59 according to an issued notice, as the manner of payment for the imposed fine.

When direct payment, step 55, or prepayment, step 57, is selected, the fine payment off-line processes are applied, respectively, against the balance of the driver's bank account recorded in direct payment transactions information area 15 of card 29, or the balance of the prepaid sum of money stored in prepayment transactions information area 17 of card 29, and a receipt for the processed fine payment is printed by printer 26 and issued to the driver in step 61. When the bank payment process is selected the fine is paid directly by the bank when information regarding a transaction is transmitted on-line to the bank, and a fine imposition notice is issued to the driver, in step 59.

Information about the fine imposition and payment is stored in card 29 and in portable terminal 21, in step 63, and then card 29 is ejected from portable terminal 21 in step 65. The information stored in the portable terminal is collectively transmitted to the central processing unit on-line or off-line.

As described above, the present invention can process the traffic-related business by using card 29 and portable terminal 21 on-line or off-line with the central processing unit, thereby enhancing the efficiency and security of the police business and providing convenience to the driver.

What is claimed is:

1. An IC card for a driver for use in conducting traffic-related business, said card comprising:
   a data memory portion for storing data; and
   a controller for reading out and recording data to and from and said data memory portion and selectively writing or reading the data from or to an external device, said data memory portion comprising:
   a driver information area in which information to identify the driver is recorded;
   a traffic-related information area storing driver's traffic-related information;
   an information area for direct payment transactions in which information related to a direct payment transaction is recorded; and
   an information area for prepayment transactions storing the information related to a prepayment transaction.

2. An apparatus for use in conducting traffic-related business, comprising:
   a driver's card for recording and reading out identification information about a driver and traffic-related information;
   central processing means for storing identification information about a plurality of drivers and corresponding traffic-related information, and for processing information transmitted thereto;
   portable terminal means for processing the identification information on a driver and fine payment information using said driver's card by selectively communicating on-line or off-line with said central processing means; and
   interface means for outputting a result of the traffic-related business processed by said portable terminal means, wherein said driver's card further comprises stored information about direct payment transactions and prepayment transactions, said portable terminal means performing payment of a fine as a selected one of a direct payment transaction and a prepayment transaction according to the stored information in said driver's card and a printer prints a document showing the particulars of the fine payment transactions.

3. An apparatus for use in conducting traffic-related business as set forth in claim 2, further comprising wireless converting means connected to said portable terminal means for enabling communication on-line, by wireless communication, between said portable terminal means and said central processing means.

4. An apparatus for use in conducting traffic-related business as set forth in claim 2, wherein said portable terminal means comprises:
   card insertion means accommodating insertion of said driver's card;
   key input means for setting an operational mode of said portable terminal unit and for writing the traffic-related information including particulars about a fine imposed upon the driver;
   displaying means for displaying information read out from said driver's card and information received through said key input means;
   storing means for storing the information read from said card and the information input through said key input means; and controlling means for processing the information read out from said card and the information input through said key input means and for processing information received from or to be transmitted to said central processing means.

5. A method for conducting traffic-related business by using an IC card and a portable terminal capable of communicating with a central processing unit, said method comprising the steps of:

inserting said IC card into said portable terminal;

searching said IC card for information corresponding to a driver, said information including driver identification information and traffic-related information, said information being read out from said IC card and read into said portable terminal;

determining whether to impose a fine against said driver for violation of a traffic regulation;

imposing said fine and selecting one of a direct payment process, a prepayment process and a bank payment process as a payment method for collecting said fine;

processing said payment method and storing particulars about said fine and said payment method into a memory of said portable terminal and into a memory of said IC card; and ejecting said IC card from said portable terminal and returning said IC card to said driver when it is determined that no fine will be imposed and upon completion of said step of storing particulars about said fine and said payment method.

6. The method as set forth in claim 5, further comprising the steps of:

determining whether car registration and wanted man information is needed;

searching, on-line, said central processing unit for car registration information and an wanted man information corresponding to said driver.

7. The method as set forth in claim 6, wherein said identifying step is performed once when said portable terminal is first turned on.

8. The method as set forth in claim 5, further comprising the steps of:

identifying an authorized user of said portable terminal by inserting an identification card for said user into said portable terminal; and searching said identification card for information verifying said user to be an authorized user of said portable terminal before allowing further use of said portable terminal.

9. The method as set forth in claim 5, further comprising the steps of:

recording information into a direct payment transactions area of a memory in said IC card when said direct payment process is selected;

issuing a receipt indicative of the collection of said fine to said driver; and storing particulars of said traffic-related business into a memory of said portable terminal.

10. The method as set forth in claim 5, further comprising the steps of:

subtracting said fine from a prepaid balance amount stored in a prepayment transactions area of a memory in said IC card when said prepayment process is selected;

recording a new balance in said prepayment transactions area of said memory in said IC card in response to said subtracting step;

issuing a receipt indicative of the collection of said fine to said driver; and storing particulars of said traffic-related business into a memory of said portable terminal.

11. The method as set forth in claim 5, further comprising the steps of:

going on-line with said central processing unit establishing a link between said portable terminal and a bank when said bank payment process is selected;

subtracting said fine directly from a bank account of said driver;

issuing a fine imposition notice to said driver; and storing particulars of said traffic-related business into a memory of said portable terminal and into a memory area of said IC card.

* * * * *

UNITED STATES PATENT AND TRADEMARK OFFICE
CERTIFICATE OF CORRECTION

PATENT NO. : 6,328,210 B1
DATED : December 11, 2001
INVENTOR(S) : Kim et al.

It is certified that error appears in the above-identified patent and that said Letters Patent is hereby corrected as shown below:

<u>Title page,</u>
Item [*] Notice, delete "0" and insert -- 877 --.

Signed and Sealed this

Twenty-eighth Day of September, 2004

JON W. DUDAS
*Director of the United States Patent and Trademark Office*